(12) United States Patent
Obliger

(10) Patent No.: US 12,268,324 B2
(45) Date of Patent: *Apr. 8, 2025

(54) BEVERAGE MACHINE WITH A PARTLY CLOSED DISPENSING FACE

(71) Applicant: SOCIETE DES PRODUITS NESTLE S.A., Vevey (CH)

(72) Inventor: Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 1062 days.

This patent is subject to a terminal disclaimer.

(21) Appl. No.: 16/980,032

(22) PCT Filed: Mar. 13, 2019

(86) PCT No.: PCT/EP2019/056268
§ 371 (c)(1),
(2) Date: Sep. 11, 2020

(87) PCT Pub. No.: WO2019/175231
PCT Pub. Date: Sep. 19, 2019

(65) Prior Publication Data
US 2021/0000288 A1     Jan. 7, 2021

(30) Foreign Application Priority Data

Mar. 14, 2018  (EP) .................................... 18161841
Dec. 20, 2018  (EP) .................................... 18214475

(51) Int. Cl.
*A47J 31/36*      (2006.01)
*A47J 31/46*      (2006.01)

(52) U.S. Cl.
CPC ........... *A47J 31/3628* (2013.01); *A47J 31/46* (2013.01)

(58) Field of Classification Search
CPC ................ A47J 31/3623; A47J 31/3628; A47J 31/3633; A47J 31/3676; A47J 31/369; A47J 31/3695
See application file for complete search history.

(56) References Cited

U.S. PATENT DOCUMENTS 4,136,202 A   1/1979   Favre
8,557,314 B2  10/2013  Gerbaulet et al.
(Continued)

FOREIGN PATENT DOCUMENTS

CN   1223840 A   7/1999
CN   1633252 A   6/2005
(Continued)

OTHER PUBLICATIONS

Chinese Office Action for Appl No. 201980015800.1 dated Apr. 26, 2023.
(Continued)

*Primary Examiner* — John J Norton
(74) *Attorney, Agent, or Firm* — K&L Gates LLP

(57) ABSTRACT

A machine (1) for preparing a beverage from an ingredient includes an extraction unit (2) that has: an ingredient extraction seat (20); an inlet arrangement (21) for guiding water into the seat (20); and a dispensing arrangement (22) for guiding beverage out of the seat (20). The dispensing arrangement (22) has a face (220) delimiting a downstream part of the seat (20) and having a flow-through portion (221) configured such that beverage flowing out the seat (20) flows through the flow-through portion (221) towards a beverage dispensing area (1'). The face (220) has a flow-inhibiting portion (222, 222a, 222b, 222c) that is at least substantially flush with the flow-through portion (221) so as to delimit the seat (20). The flow-inhibiting portion (222, 222a, 222b, 222c) is configured such that beverage flowing out the seat (Continued)

(20) is inhibited, e.g. prevented, from passing through the flow-inhibiting portion (222, 222a, 222b, 222c).

17 Claims, 4 Drawing Sheets

(56) References Cited

U.S. PATENT DOCUMENTS

| 9,445,687 | B2 | 9/2016 | Mahlich | |
| 2007/0017378 | A1 | 1/2007 | Takizawa et al. | |
| 2008/0069930 | A1 | 3/2008 | Wood et al. | |
| 2009/0155422 | A1* | 6/2009 | Ozanne | A47J 31/0615 426/89 |
| 2010/0003371 | A1 | 1/2010 | Ozanne et al. | |
| 2011/0212231 | A1 | 9/2011 | McLaughlin | |
| 2011/0297005 | A1 | 12/2011 | Mariller | |
| 2012/0199012 | A1 | 8/2012 | Daburger et al. | |
| 2012/0251693 | A1 | 10/2012 | Kamerbeek et al. | |
| 2015/0056343 | A1* | 2/2015 | Mori | A47J 31/3633 99/295 |
| 2016/0309952 | A1 | 10/2016 | Van Den Aker et al. | |
| 2017/0135516 | A1 | 5/2017 | Fantappie | |

FOREIGN PATENT DOCUMENTS

| CN | 102573580 A | 7/2012 |
| CN | 105476478 A | 4/2016 |
| CN | 105828675 A | 8/2016 |
| EP | 0512470 A1 | 11/1992 |
| EP | 1247480 A1 | 10/2002 |
| EP | 2210539 A2 | 7/2010 |
| JP | 2010063763 A | 3/2010 |
| RU | 2013147192 A | 4/2015 |
| WO | 2013127476 | 9/2013 |
| WO | 2015155144 A1 | 10/2015 |

OTHER PUBLICATIONS

Russian Office Action for Russian Appl No. 2020133029 dated Jul. 18, 2022.

\* cited by examiner

Fig. 4
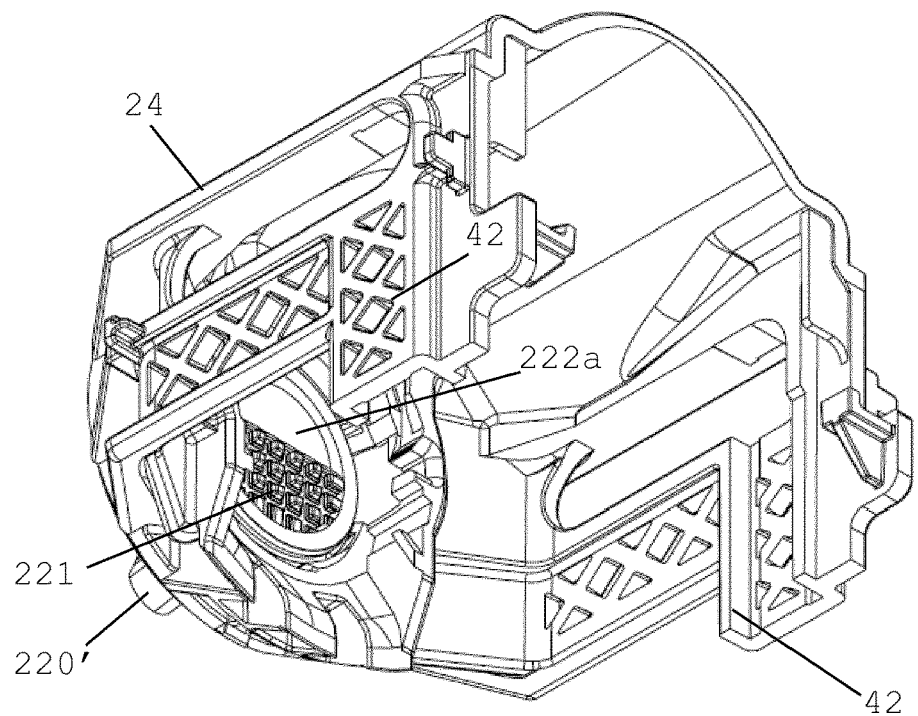
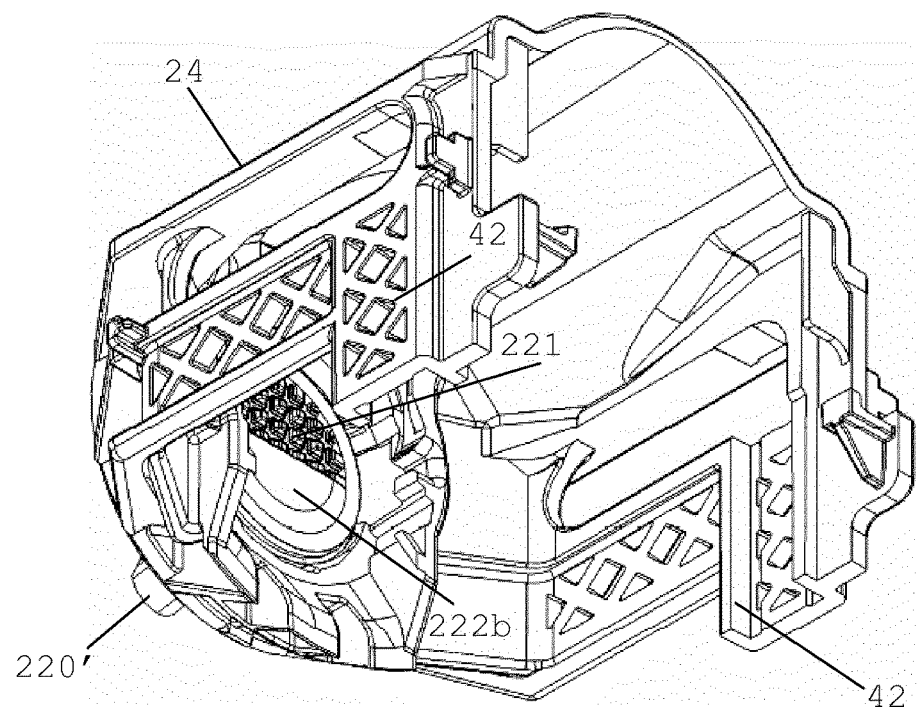
Fig. 5

BEVERAGE MACHINE WITH A PARTLY CLOSED DISPENSING FACE

CROSS REFERENCE TO RELATED APPLICATIONS

The present application is a National Stage of International Application No. PCT/EP2019/056268, filed on Mar. 13, 2019, which claims priority to European Patent Application No. 18161841.4, filed on Mar. 14, 2018 and European Patent Application No. 18214475.8, filed Dec. 20, 2018, the entire contents of which are being incorporated herein by reference.

FIELD OF THE INVENTION

The field of the invention pertains to beverage preparation machines provided with a particular extraction arrangement, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The preparation of beverage by extraction of an extractible ingredient, such as a brewable ingredient e.g. roast-and-ground coffee and/or tea, in particular contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Hence, handy prior art beverage extraction systems utilize an exchangeable capsule, e.g. rigid capsule, sachet or flexible pod, comprising a tearable beverage outlet membrane, e.g. a thin aluminium foil, which can be torn only when a sufficient deformation of this membrane has occurred against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

Whereas the ingredient extraction space, e.g. with a capsule and/or an extraction chamber is usually symmetrical along the general flow direction, enabling easy handling of the ingredient, it may be advantageous to obtain a different flow path at extraction that is such as to obtain or increase certain extraction effects, e.g. creama formation or intensity of the extraction.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The invention relates to a machine for preparing a beverage from an ingredient.

The beverage may be prepared from a capsule containing the ingredient of the beverage. The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

The machine includes an extraction unit that has an ingredient extraction seat, an inlet arrangement for guiding water into the seat and a dispensing arrangement for guiding beverage out of the seat.

Examples of ingredient extraction seats, e.g. extraction chambers, are disclosed in EP 1767129, WO 2012/025258, WO 2012/025259, WO 2013/127476, WO 2014/056641, WO 2014/096122, WO 2014/096123, WO 2015/155144 and WO 2015/155145.

The dispensing arrangement has a face delimiting a downstream part of the seat and having a flow-through portion configured such that beverage flowing out the seat flows through the flow-through portion towards a beverage dispensing area.

The machine may have a drop stop arrangement between the seat and the beverage dispensing area. Examples of drop stops are disclosed in WO 2006/050769, WO 2012/072758, WO 2013/127907, WO 2016/050657, WO 2016/083488, WO 2018/069266 and EP2017208722.3.

The dispensing area may be delimited by a support for supporting a user-recipient, e.g. a cup or mug. For instance, the support is a support device that is connected an outside machine housing and/or a machine frame, or the support device is external to such machine, for example the machine itself is placed for dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under a dispensing outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198710, EP 2014198712 and EP 2014198715.

The face further has a flow-inhibiting portion that is at least substantially flush with the flow-through portion so as to delimit the seat. The flow-inhibiting portion is configured such that beverage flowing out the seat is inhibited, e.g. prevented, from passing through the flow-inhibiting portion.

By having the flow-through portion and the flow-inhibiting portion at least substantially flush, the two portions are normally substantially level or even with one another. The flow-through portion may typically form a flow-through window or screen extending over part of the face, delimiting the downstream part of the seat. Normally, such face is substantially flat, possibly bearing or possibly being associated with raised elements, e.g. protruding substantially orthogonally from the face, such as capsule orifice forming elements.

For instance, the flow inhibiting portion is immobile relative to or fixed relative to the flow-through portion.

Hence, a particular flow can be generated through the ingredient, e.g. contained in a capsule, and out of the seat by the downstream arrangement for the flow-through portion and the flow-inhibiting portion forming the face and delimiting the seat. By integrating this geometry in the face delimiting the seat, it is not dependant on a special care to be given to the way the ingredient, e.g. within a capsule, is introduced into the seat.

The face may be stationary relative to the seat such that the flow-through portion always takes the same position relative to the seat for an extraction.

The flow-through portion may be able to take different positions relative to the seat so as to control a flow path of water through the ingredient when in the seat depending on the position of the flow-through portion.

To achieve this, the face is typically displaced, e.g. manually and/or automatically such as in a motorized manner, along a plane formed by the substantially flush flow-through portion and flow-inhibiting portion.

Hence, by allowing a displacement of the flow-through portion relative to the seat, the flow path of water through the ingredient in the seat may be adjusted. For instance, the flow path of water may be directed predominantly to an upper part of the seat or it may be directed predominantly to a lower part of the seat. It may be directed predominantly to a left or a right side of the seat.

The position of the flow-through portion relative to the seat may be stationary from a beginning to an end of an extraction of the ingredient in the seat.

The position of the flow-through portion relative to the seat may be changed during an extraction of the ingredient in the seat. For instance, the flow path of water of water is directed predominantly to an upper part of the seat during an beginning of an extraction of the ingredient and then it may be directed predominantly to a lower part of the seat during an end of an extraction of the ingredient, or vice versa.

The position of the flow-through portion relative to the seat may be adjusted with the view to substantially homogenize the flow of water through the ingredient.

The flow-through portion and the flow-inhibiting portion may have a surface area ratio in the range of 0.1 to 10, such as 0.2 to 5, e.g. 0.33 to 3, for instance 0.4 to 2.5, for example 0.5 to 2 or 0.66 to 1.5 or 0.75 to 1.33, such as about 1.

Typically, the dispensing arrangement has a wall forming the face, the wall having an opened or cut-away or interrupted part forming or delimiting the flow-through portion and the wall having the flow-inhibiting portion. The flow inhibiting portion may be formed by a closed part of the wall.

The closed part can be an intrinsically closed part formed of a non-pervious part of the wall.

The closed part may be an intrinsically open part of the wall, e.g. a part of the wall provided with at least one through hole, that is closed by a sealing arrangement closing the open part.

The closed part may be: a top part, e.g. an intrinsically closed top part or a intrinsically open top part closed by a top sealing arrangement; or a bottom part, e.g. an intrinsically closed bottom part or an intrinsically open bottom part closed by a bottom sealing arrangement; or an intermediate part, e.g. an intrinsically closed intermediate part or a intrinsically open intermediate part closed by a top sealing arrangement.

The sealing arrangement can be located upstream of the intrinsically open part, e.g. in the seat, and/or downstream of the closed intrinsically open part. The sealing arrangement may be an upstream or downstream sheath or plate member or coating.

The sealing arrangement can be located in openings of the intrinsically open part, typically as a filling.

The wall may be formed by a plate-like or sheet-like member that has at the flow-through portion a flow-through structure formed by at least one of: one or more through holes; a reticulated structure; a foraminate structure; and a porous structure.

The face can have a, at least approximately, disc shape.

The flow-inhibiting portion may form a circular or annular sector, e.g. generally half disc, such as a circular or annular sector having a circle centre that is at least approximately concentric with the face's circular shape. For instance, the circular or annular sector extends to a circular edge of the face's circular shape. The circular or annular sector may have a central angle in the range of 60 to 300°, such as 90 to 270°, for example 120 to 240°, e.g. 150 to 210°.

The flow-inhibiting portion can form a disc segment. The disc segment may have a disc centre that is at least approximately concentric with the face's shape. The disc segment and the flow-through portion can have a surface area ratio that is in the range of 0.2 to 5, such as 0.5 to 2, for instance 0.66 to 1.5, e.g. 0.75 to 1.33.

The flow-through portion may have a number of flow-through holes: in the range of 5 to 15, such as 7 to 13, e.g. 9 to 12; and/or each through hole having a minimum diameter transverse to a beverage outflow direction along the hole, in the range of about 0.1 to 1 mm, such as 0.3 to 0.8 mm, e.g. 0.4 to 0.6 mm.

The extraction seat can be configured for receiving the ingredient capsule that is provided with an outlet membrane, the face, typically the flow-through portion of the face and optionally its flow-inhibiting portion, bearing a plurality of raised elements that project upstream and that are configured for forming beverage outlet orifices in the outlet membrane. For instance, the orifices are provided in the outlet membrane by the elements:
  before supply of water into the seat via the inlet arrangement, e.g. the orifices being provided in the outlet membrane at insertion of the capsule into the seat; and/or
  by pressure rise in the capsule caused by supplying water, e.g. at a supply pressure in the range of 5 to 20 bar such as 8 to 15 bar, so as to urge the outlet membrane against the plurality of raised elements.

The flow-through portion may be provided with one or more flow-through holes, such as the above mentioned flow-through holes, the flow-through holes extending from bottom ends of the raised elements at the face.

The extraction seat can be configured for receiving the ingredient capsule that is provided with an outlet membrane, the face being devoid of any piercing and/or cutting element for piercing and/or cutting the outlet membrane. The beverage outlet orifices can be provided in the outlet membrane:
  prior to housing the capsule in the extraction seat, e.g. when the capsule is manufactured or subsequently conditioned e.g. in such machine prior to reaching the seat; and/or
  by being formed by tearing and/or breaking the membrane by pressure rise in the capsule by supply of water into the capsule, for instance to open pre-weakened parts of the membrane and/or actuate a membrane opening element comprised inside the capsule.

Self-opening capsules are for instance disclosed in CH 605 293 and WO 03/059778.

The opening of capsules by a machine's piercing elements of a plate is for example disclosed in EP 512 470 and EP 2 068 684.

Examples of suitable mixing units with mixing chambers are disclosed in WO 2008/037642 and WO 2013/026843.

The extraction seat may be delimited by a first part and a second part that are relatively movable between: an open position for inserting said ingredient, e.g. within said capsule, into the extraction seat and/or for removing such ingredient from the seat; and a closed position for extracting in the seat the ingredient.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The first and second parts can be relatively movable by an actuator such as by a user-handle or by an electric motor, e.g. an actuator connected to at least one of the first and second parts by a transmission such as one or more of gears, belts, cams and cam-followers, levers and/or hydraulic transmissions. For instance, the electric motor is controlled by a control unit for controlling the water supply arrangement, such as a unit comprising a processing device, e.g. a controller and/or a user interface.

Examples of motors implemented to actuate such first and second parts are disclose in EP 1767129, WO 2012/025258, WO 2012/025259, WO 2013/127476, WO 2014/056641, WO 2014/096122, WO 2014/096123, WO 2015/155144 and WO 2015/155145.

The first part may bear the face and the second part may bear the inlet arrangement.

One of the first and second parts can be stationary relative to an outside machine housing and the other of the first and second parts can be movable relative to the outside machine housing.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The inlet arrangement may be fluidically connected to a water supply arrangement via a water guide.

The water supply arrangement may include at least one of: a water source for supplying water to the inlet arrangement, such as a water tank and/or a connector to an external water supply line; a water driver for driving water to the inlet arrangement, such as a pump; and a thermal conditioner, e.g. a heater and/or a cooler, for thermally conditioning water supplied or to be supplied to the inlet arrangement, such as a water flow thermal conditioner or a water accumulator thermal conditioner.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

For instance, the water supply arrangement is associated with a or the above mentioned control unit for controlling the water supply arrangement, such as a unit comprising a processing device e.g. a controller and/or a user interface.

The inlet arrangement may be associated with a piercing or cutting arrangement configured to pierce or cut water inlet opening(s) into the ingredient capsule in the ingredient extraction seat so that water circulating along the inlet arrangement is passed into the capsule via the water inlet opening.

The seat can be associated with an un-extracted ingredient insertion passage, e.g. extending from outside such machine, and/or an extracted ingredient evacuation passage, e.g. extending towards a waste ingredient collector.

Examples of waste ingredient collectors are disclosed in EP 1867260, WO 2009/074559, WO 2009/135869, WO 2010/128109, WO 2011/086087, WO 2011/086088, WO 2017/118713, WO 2017/148965 and EP 2018156589.

The insertion passage, when present, may be associated with an ingredient barrier, such as a gate or door or hatch, for selectively allowing and preventing an ingredient pass along the passage. Details of suitable barriers for an ingredient, such as an ingredient supplied within a capsule, are disclosed in WO 2012/126971, WO 2014/056641, WO 2014/056642 and WO 2015/086371.

At least one of the passages can be associated with guides such as rails or grooves, for cooperating with and guiding a capsule, e.g. a flange of the capsule, along the passage to and/or from the seat.

At least one of the passages may be associated with a stop for immobilizing said capsule at about a level of the seat.

The interaction between the first and second parts (and optionally the transfer channel) and an ingredient capsule may be of the type disclosed in WO 2005/004683, WO 2007/135135, WO2007/135136, WO 2008/037642 and WO 2013/026856.

When present, the control unit may have a control circuit, e.g. a control circuit for controlling a or the above liquid driver and/or a or the above thermal conditioner. The control circuit may include a micro-controller and/or a microprocessor.

The control unit can comprise an ingredient sensor such as an ingredient capsule sensor.

Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit.

The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The invention also relates to a use of an ingredient, such as an ingredient contained in an capsule, for extraction in a machine as described above.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

The invention will now be described with reference to the schematic drawings, wherein:

FIGS. 4 to 6 illustrate variations according to the invention of extraction unit downstream parts.

DETAILED DESCRIPTION

Figure 1:
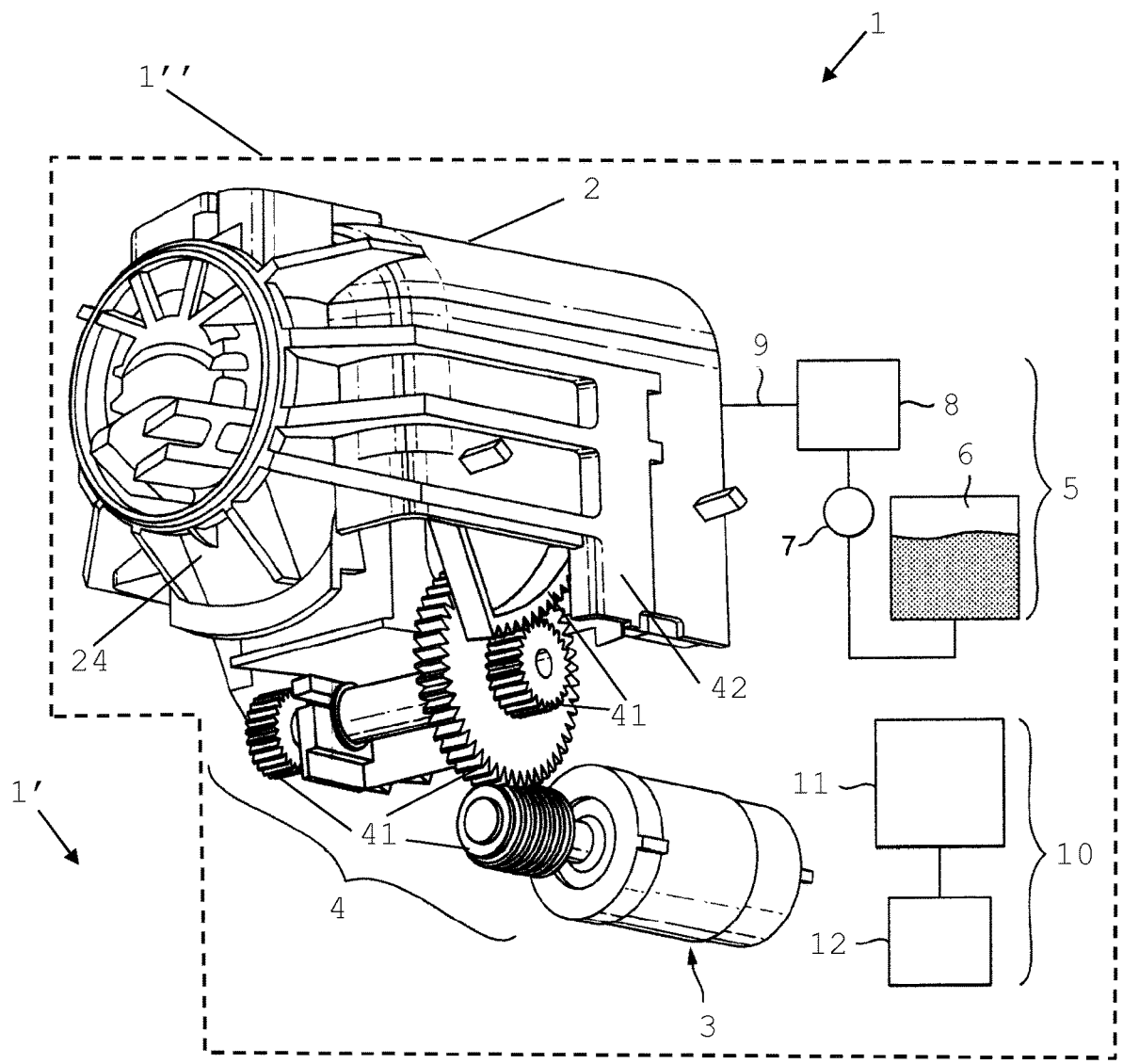
FIG. 1 shows an example of part of a beverage machine according to the invention, part of which being schematically illustrated.
Figure 2:
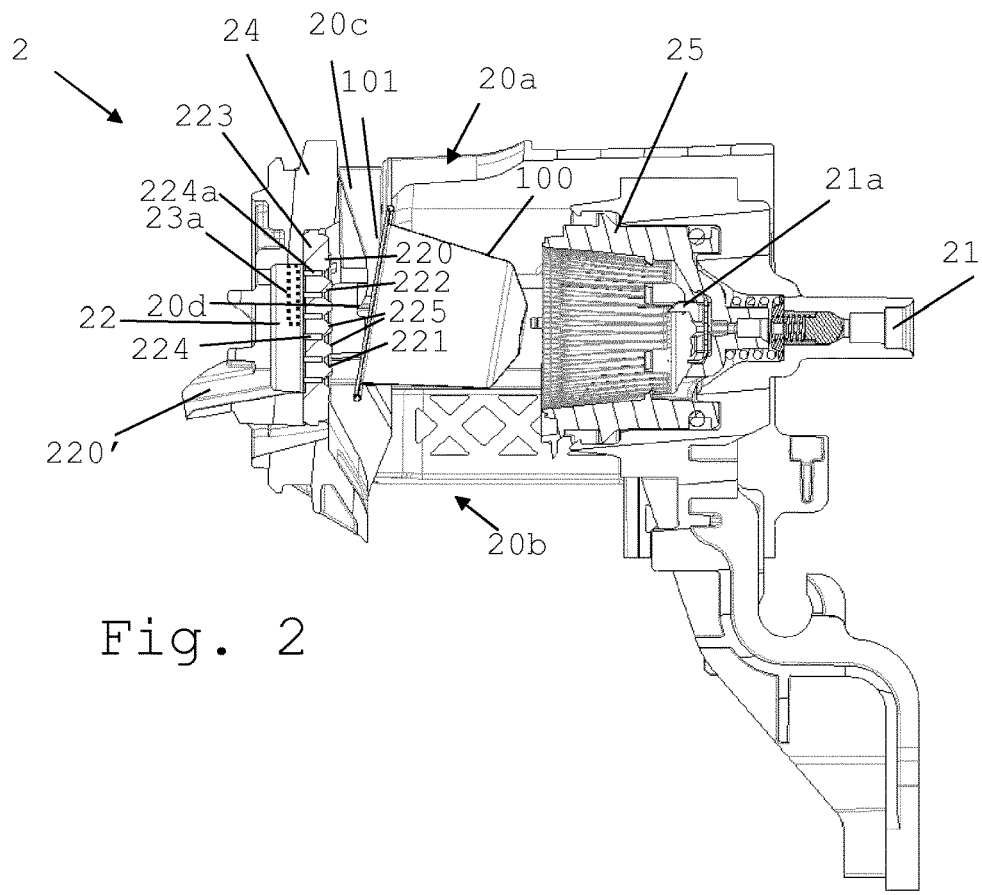
FIG. 2 is a cross-sectional view of an extraction unit of the machine of FIG. 1, an ingredient capsule being in the process of being introduced into the unit's seat.
Figure 3:
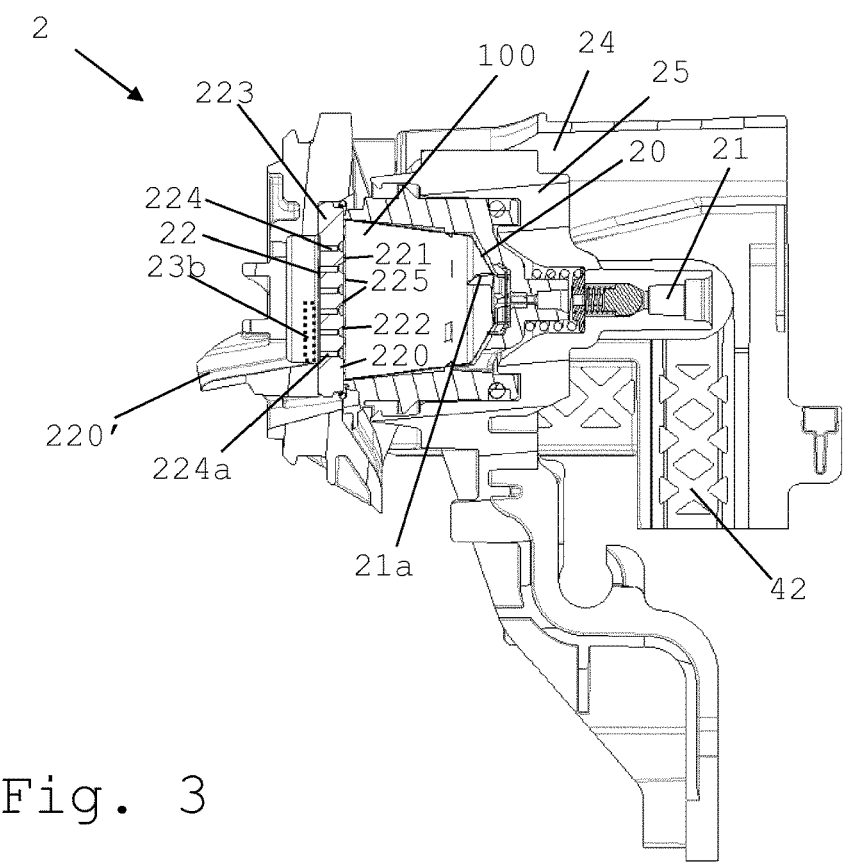
FIG. 3 is a cross-section view of the extraction unit of FIG. 2, the ingredient capsule being housed in the seat, ready for extraction.
Figure 6:
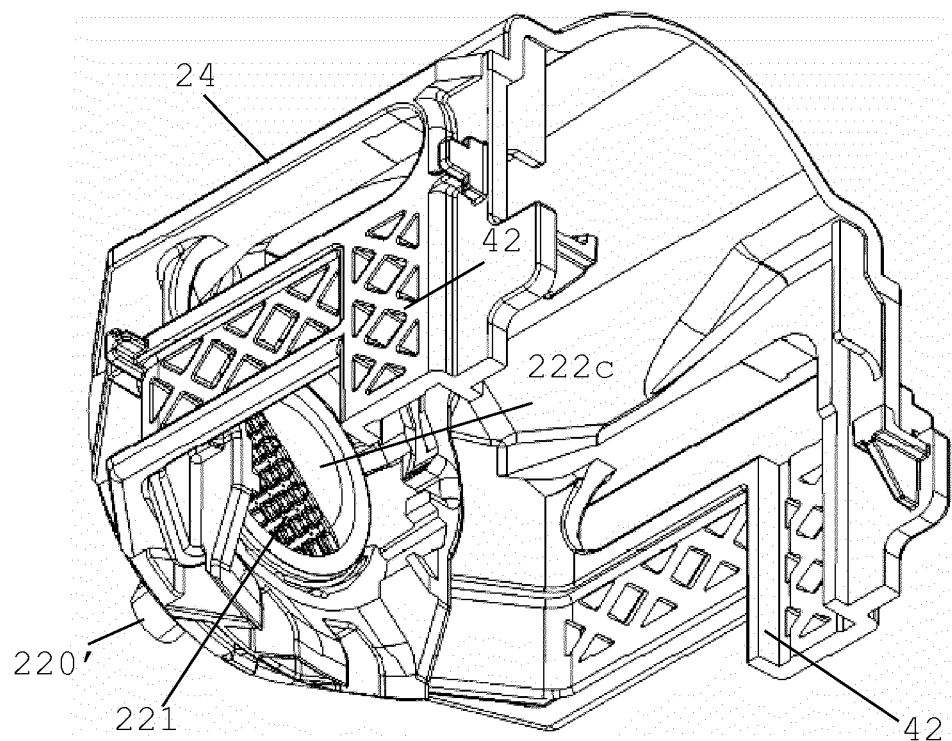

FIGS. 1 to 3 illustrate an exemplary embodiment of a beverage machine 1 according to the invention, FIGS. 4 to 6 illustrating further variations according to the invention of the machine's extraction unit, in particular of the downstream part of the machine's dispensing arrangement 22.

Machine 1 is configured for preparing a beverage from an ingredient, such as an ingredient supplied within a capsule 100 into such machine 1. See FIGS. 1 to 3.

Machine 1 has an extraction unit 2 that has an ingredient extraction seat 20, an inlet arrangement 21 for guiding water into seat 20 and a dispensing arrangement 22 for guiding beverage out of seat 20.

Dispensing arrangement 22 has a face 220 delimiting a downstream part of seat 20 and having a flow-through portion 221 configured such that beverage flowing out the seat 20 flows through the flow-through portion 221 towards a beverage dispensing area 1'.

Face 220 further has a flow-inhibiting portion that is at least substantially flush with flow-through portion 221 so as to delimit seat 20, flow-inhibiting portion 222,222a,222b, 222c being configured such that beverage flowing out the seat 20 is inhibited, e.g. prevented, from passing through flow-inhibiting portion 222,222a,222b,222c. For instance, flow inhibiting portion 222,222a,222b,222c is immobile relative to or fixed relative to flow-through portion 221. See FIGS. 2 to 6.

Face 220 may be non-movable relative to seat 20.

Flow-through portion 221 may be being able to take different positions relative to seat 20 so as to control a flow path of water through the ingredient when in the seat 20 depending on the position of flow-through portion 221. See FIGS. 4 to 6 which illustrate a face 220 in different angular positions.

Flow-through portion 221 and flow-inhibiting portion 222,222a,222b,222c have a surface area ratio in the range of 0.1 to 10, such as 0.2 to 5, e.g. 0.33 to 3, for instance 0.4 to 2.5, for example 0.5 to 2 or 0.66 to 1.5 or 0.75 to 1.33, such as about 1.

Dispensing arrangement 22 can include a wall 223 forming face 220. Wall 223 may have an opened or cut-away or interrupted part forming or delimiting flow-through portion 221. Wall 223 may have the flow-inhibiting portion 222, 222a,222b,222c, the flow inhibiting portion being formed by a closed part of wall 223.

The closed part of wall 223 may be:
- an intrinsically closed part 222a,222b,222c formed of a non-pervious part of wall 223 (FIGS. 4 to 6); and/or
- an intrinsically open part 222 of wall 223, e.g. provided with at least one through hole 224a, that is closed by a sealing arrangement 23a,23b closing the open part (FIGS. 2 and 3).

The closed part can be: a top part 222,222a, e.g. an intrinsically closed top part 222a or a intrinsically open top part 222 closed by a top sealing arrangement 23a; or a bottom part 222,222b, e.g. an intrinsically closed bottom part 222b or an intrinsically open bottom part 222 closed by a bottom sealing arrangement 23b; or an intermediate part 222c, e.g. an intrinsically closed intermediate part 222c or a intrinsically open intermediate part closed by a top sealing arrangement.

Sealing arrangement 23a,23b may be located: upstream of the intrinsically open part, e.g. in the seat 20, and/or downstream of the intrinsically open part, typically as an upstream or downstream sheath or plate member or coating; and/or in openings of the intrinsically open part, typically as a filling.

Wall 223 can be formed by a plate-like or sheet-like member 223 that has at flow-through portion 221 a flow-through structure formed by at least one of: one or more through holes; a reticulated structure; a foraminate structure; and a porous structure.

Face 220 can have a, at least approximately, disc shape.

Flow-inhibiting portion 222,222a,222b,222c may form a circular or annular sector, e.g. generally half disc 222a,222b, 222c, such as a circular or annular sector having a circle centre that is at least approximately concentric with the face's circular shape. For instance, the circular or annular sector extends to a circular edge of the face's circular shape. The circular or annular sector may have a central angle in the range of 60 to 300°, such as 90 to 270°, for example 120 to 240°, e.g. 150 to 210°.

Flow-inhibiting portion 222,222a,222b,222c can form a disc segment 222a,222b,222c. The disc segment can have a disc centre that is at least approximately concentric with the face's shape. Disc segment 222a,222b,222c and flow-through portion 221 may have a surface area ratio that is in the range of 0.2 to 5, such as 0.5 to 2, for instance 0.66 to 1.5, e.g. 0.75 to 1.33.

Flow-through portion 222 may have a number of flow-through holes 224: in the range of 5 to 15, such as 7 to 13, e.g. 9 to 12; and/or each through hole 224 having a minimum diameter transverse to a beverage outflow direction along the hole, in the range of about 0.1 to 1 mm, such as 0.3 to 0.8 mm, e.g. 0.4 to 0.6 mm.

Extraction seat 20 can be configured for receiving ingredient capsule 100 that is provided with an outlet membrane 101. Face 220, typically its flow-through portion 221 and optionally its flow-inhibiting portion 222, bearing a plurality of raised elements 225 that project upstream and that are configured for forming beverage outlet orifices in the outlet membrane 101.

For instance, the orifices are provided in the outlet membrane by elements 225: before supply of water into seat 20 via inlet arrangement 21, e.g. the orifices being provided in the outlet membrane at insertion of the capsule into the seat; and/or by pressure rise in capsule 100 caused by supplying water, e.g. at a supply pressure in the range of 5 to 20 bar such as 8 to 15 bar, so as to urge outlet membrane 101 against the plurality of raised elements 225.

Flow-through portion 221 can be provided with one or more flow-through holes 224, such as the above mentioned flow-through holes 224. Flow-through holes 224 may extend from bottom ends of raised elements 225 at face 220.

The extraction seat may be configured for receiving an ingredient capsule that is provided with an outlet membrane, the face of the dispensing arrangement being devoid of any piercing and/or cutting element for piercing and/or cutting the outlet membrane. For instance, the beverage outlet orifices are provided in the outlet membrane: prior to housing the capsule in the extraction seat, e.g. when the capsule is manufactured or subsequently conditioned e.g. in such machine prior to reaching the seat; and/or by being formed by tearing and/or breaking the membrane by pressure rise in the capsule by supply of water into the capsule, for instance to open pre-weakened parts of the membrane and/or actuate a membrane opening element comprised inside the capsule.

Extraction seat 20 can be delimited by a first part 24 and a second part 25 that are relatively movable between: an open position (FIG. 2) for inserting the ingredient, e.g. within said capsule 100, into extraction seat 20 and/or for removing such ingredient from seat 20; and a closed position (FIG. 3) for extracting in seat 20 the ingredient.

First and second parts 24,25 can be relatively movable by an actuator such as by a user-handle or by an electric motor 3, e.g. an actuator connected to at least one of first and second parts 24,25 by a transmission 4 such as one or more of gears 41, belts, cams 42 and cam-followers, levers and/or hydraulic transmissions.

For instance, first and second parts 24,25 are relatively moved by electric motor 3 that is controlled by a control unit 10 for controlling water supply arrangement 5, such as a unit 10 comprising a processing device e.g. a controller 11 and/or a user interface 12.

First part 24 may bear face 220 and second part 25 may bears inlet arrangement 21 (FIGS. 2 and 3).

One of first and second parts 24,25 can be stationary relative to an outside machine housing 1" and the other of first and second parts 24,25 can be movable relative to the outside machine housing 1".

Inlet arrangement 21 may be fluidically connected to a water supply arrangement 5 via a water guide 9. See FIGS. 1 to 3.

Water supply arrangement 5 may include at least one of: a water source 6 for supplying water to inlet arrangement 21, such as a water tank and/or a connector to an external water supply line; a water driver 7 for driving water to inlet arrangement 21, such as a pump; and a thermal conditioner 8, e.g. a heater and/or a cooler, for thermally conditioning water supplied or to be supplied to inlet arrangement 21, such as a water flow thermal conditioner or a water accumulator thermal conditioner. For instance, water supply arrangement 5 is associated with a or the above mentioned control unit 10 for controlling water supply arrangement 5, such as a unit 10 having a processing device e.g. a controller 11 and/or a user interface 12. See FIG. 1.

Inlet arrangement 21 can be associated with a piercing or cutting arrangement 21*a* configured to pierce or cut water inlet opening(s) into ingredient capsule 100 in ingredient extraction seat 20 so that water circulating along inlet arrangement 21 is passed into capsule 100 via the water inlet opening. See FIGS. 1 and 2.

Seat 20 may be associated with an un-extracted ingredient insertion passage 20*a*, e.g. extending from outside such machine, and/or an extracted ingredient evacuation passage 20*b*, e.g. towards a waste ingredient collector. For instance, at least one of passages 20*a*,20*b* is associated with guides 20*c* such as rails or grooves, for cooperating with and guiding capsule 100 along the passage to and/or from seat 20 and/or with a stop 20*d* for immobilizing capsule 100 at about a level of the seat 20. See FIGS. 2 and 3.

The invention claimed is:

1. A machine for preparing a beverage from an ingredient, the machine comprising:
   an extraction unit having an ingredient extraction seat;
   an inlet arrangement for guiding water into the ingredient extraction seat; and
   a dispensing arrangement for guiding the beverage out of the ingredient extraction seat, the dispensing arrangement comprising a face delimiting a downstream part of the ingredient extraction seat and having a flow-through portion configured such that the beverage flowing out of the ingredient extraction seat flows through the flow-through portion towards a beverage dispensing area,
   the face further having a flow-inhibiting portion that is at least substantially flush with the flow-through portion so as to delimit the ingredient extraction seat, the flow-inhibiting portion being configured such that the beverage flowing out of the ingredient extraction seat is inhibited from passing through the flow-inhibiting portion, wherein the flow-through portion and the flow-inhibiting portion have a surface area ratio in the range of 0.66 to 1.5;
   wherein the dispensing arrangement has a wall forming the face, the wall having an opened, cut-away, or interrupted part forming or delimiting the flow-through portion and the wall having the flow-inhibiting portion being formed by a closed part of the wall.

2. The machine of claim 1, wherein the wall is formed by a plate-like or sheet-like member that has at the flow-through portion a flow-through structure formed by at least one of: a plurality of through holes; a reticulated structure; a foraminate structure; and a porous structure.

3. The machine of claim 1, wherein the face has at least approximately a disc shape.

4. The machine of claim 1, wherein the flow-through portion has a number of flow-through holes in the range of 5 to 15; and/or
   each through hole having a minimum diameter transverse to a beverage outflow direction along the hole, in the range of about 0.1 to 1 mm.

5. The machine of claim 1, wherein the ingredient extraction seat is configured for receiving the ingredient in an ingredient capsule that is provided with an outlet membrane, the face bearing a plurality of raised elements that project upstream and that are configured for forming beverage outlet orifices in the outlet membrane.

6. The machine of claim 5, wherein the flow-through portion of the face bears the plurality of raised elements.

7. The beverage extraction unit of claim 1, wherein the ingredient extraction seat is configured for receiving the ingredient in an ingredient capsule that is provided with an outlet membrane, the face being devoid of any piercing and/or cutting element for piercing and/or cutting the outlet membrane.

8. The machine of claim 1, wherein the ingredient extraction seat is delimited by a first part and a second part that are relatively movable between:
   an open position configured for inserting the ingredient into the ingredient extraction seat and/or for removing the ingredient from the ingredient extraction seat; and
   a closed position configured for extracting in the ingredient extraction seat the ingredient.

9. The machine of claim 8, wherein the first part bears the face and the second part bears the inlet arrangement.

10. The machine of claim 8, wherein one of the first and second parts is stationary relative to an outside machine housing and the other of the first and second parts is movable relative to the outside machine housing.

11. The machine of claim 8, wherein the ingredient is in an ingredient capsule, wherein the first part and the second part are movable between an open position for at least one of inserting the ingredient capsule in the ingredient extraction seat and removing the ingredient capsule from the ingredient extraction seat and (ii) a closed position for extracting the ingredient from the ingredient capsule while the capsule is seated in the ingredient extraction seat.

12. The machine of claim 1, wherein the inlet arrangement is fluidically connected to a water supply arrangement via a water guide.

13. The machine of claim 1, wherein the inlet arrangement is associated with a piercing or cutting arrangement configured to pierce or cut water inlet opening(s) into an ingredient capsule in the ingredient extraction seat so that water circulating along the inlet arrangement is passed into the ingredient capsule via the water inlet opening.

14. The machine of claim 1, wherein the ingredient extraction seat is associated with an un-extracted ingredient insertion passage.

15. The machine of claim 1, wherein the flow-inhibiting portion is configured such that the beverage flowing out of the ingredient extraction seat is prevented from passing through the flow-inhibiting portion.

16. A method for preparing a beverage from an ingredient in a machine, the method comprising:
   extracting, by the machine, the ingredient in a capsule, the machine comprising an extraction unit that has an ingredient extraction seat, an inlet arrangement and a dispensing arrangement;
   guiding, by the inlet arrangement, water into the ingredient extraction seat; and
   guiding, by the dispensing arrangement, the beverage out of the ingredient extraction seat, the dispensing arrangement comprising a face delimiting a downstream part of the ingredient extraction seat and having a flow-through portion configured such that the beverage flowing out of the ingredient extraction seat flows through the flow-through portion towards a beverage dispensing area,
   the face further having a flow-inhibiting portion that is at least substantially flush with the flow-through portion so as to delimit the ingredient extraction seat, the flow-inhibiting portion being configured such that the beverage flowing out of the ingredient extraction seat is inhibited from passing through the flow-inhibiting portion, wherein the flow-through portion and the flow-inhibiting portion have a surface area ratio in the range of 0.66 to 1.5; wherein the dispensing arrangement has a wall forming the face, the wall having an opened, cut-away, or interrupted part forming or delimiting the flow-through portion and the wall having the flow-inhibiting portion being formed by a closed part of the wall.

17. The method of claim 16, further comprising preventing, by the flow-inhibiting portion, the beverage flow out of the ingredient extraction seat from passing through the flow-inhibiting portion.

* * * * *